Nov. 2, 1965  R. C. THOR  3,216,013
PULSE COMPRESSION RADAR SYSTEM UTILIZING
LOGARITHMIC PHASE MODULATION
Filed Oct. 23, 1961  5 Sheets-Sheet 1
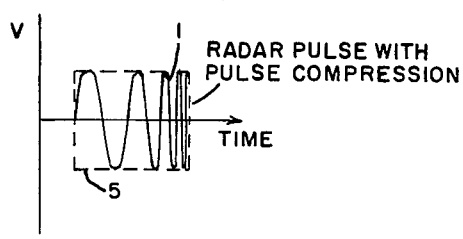
FIG.IA.
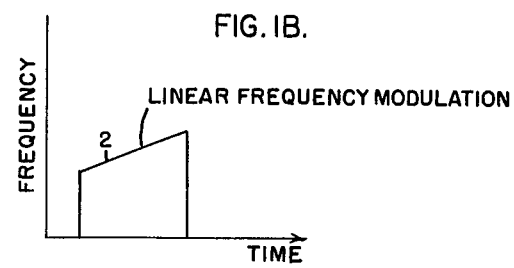
FIG.IB.
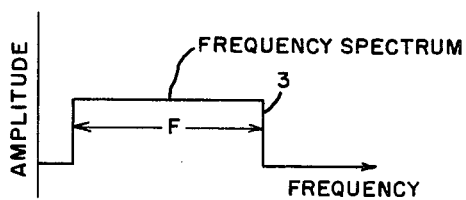
FIG.IC.
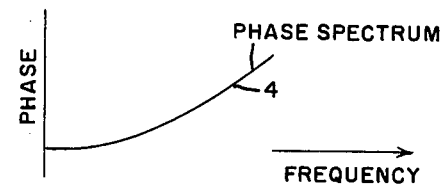
FIG.ID.
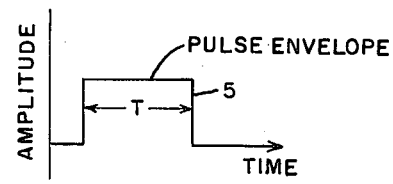
FIG.IE.
INVENTOR:
ROBERT C. THOR,
BY *Dudley T. Hardy*
HIS AGENT.

INVENTOR:
ROBERT C. THOR,
BY Dudley J. Ready
HIS AGENT.

INVENTOR:
ROBERT C. THOR,
BY *Dudley J. Ready*
HIS AGENT.

Nov. 2, 1965   R. C. THOR   3,216,013
PULSE COMPRESSION RADAR SYSTEM UTILIZING
LOGARITHMIC PHASE MODULATION
Filed Oct. 23, 1961                              5 Sheets-Sheet 4

INVENTOR:
ROBERT C. THOR,
BY *Dudley T. Heady*
HIS AGENT.

INVENTOR:
ROBERT C. THOR,
BY *Dudley J. Ready*
HIS AGENT.

United States Patent Office 3,216,013
Patented Nov. 2, 1965

3,216,013
PULSE COMPRESSION RADAR SYSTEM UTILIZING LOGARITHMIC PHASE MODULATION
Robert C. Thor, Liverpool, N.Y., assignor to General Electric Company, a corporation of New York
Filed Oct. 23, 1961, Ser. No. 146,746
14 Claims. (Cl. 343—17.2)

This invention is directed to electromagnetic wave transmission systems in which the operation of the system is substantially independent of relative motion between the transmitter (or reflection surface) and the receiver at very high radial velocities. More particularly, the invention is advantageously applied to radar apparatus which produces a pulse waveform permitting large compression ratios for pulse compression radar transmission and reception that is undegraded by Doppler frequency shifts and is therefore suitable for the detection and measurement of objects having orbital velocities and for high resolution range measurements.

For any given radar system, several factors operate to place a limitation on the maximum range at which a target can be detected and on the resolution of range and velocity measurements. The invention is directed to signal processing circuitry employing pulses having improved waveform characteristics. Three transmitted pulse waveform parameters—bandwidth F, pulse time duration T, and total energy—are known to be of prime importance in placing limits on radar performance. The effects of these waveform parameters is described in some detail in the IRE Transaction on Military Electronics, April 1961 ("Principles of Pulse Compression" by H. O. Ramp and E. R. Wingrove).

The common radar pulse is comprised of a number of cycles cut out of a continuous, constant amplitude, sine wave. In a radar system operating with such a pulse the maximum range of detection and range resolution are interrelated in such a manner that specifying the requirements of either one sets an upper limit on the remaining one (under practical peak power conditions). Likewise range resolution and velocity resolution are interrelated in the same manner. The maximum range of detection is determined by the pulse energy (which is proportional to pulse duration assuming a constant peak amplitude); the velocity resolution is also proportional to pulse duration; and the range resolution is determined by the pulse bandwidth (which is inversely proportional to the pulse duration for a common radar pulse). Thus there are conflicting requirements between the maximum range of detection and range resolution and also between velocity and range resolution. For these reasons, it has been found necessary to turn to pulse compression techniques to improve the product of pulse duration T and bandwidth F which is determinative of the available information in the pulse.

Pulse compression techniques synthesize a short pulse in a long pulse form. That is, a long pulse is produced for radiation which bears a transformed relationship to a short pulse such that special pulse processing circuitry can physically transform echo pulses in a shortened pulse form. The synthesized pulse is an expanded short pulse which facilitates the transmission of a high energy signal by enabling pulse tailoring to include large bandwidths independently of the pulse duration. The pulse expansion can also be considered a process of dispersing the relative phases of the frequency components of a short pulse. The above article also describes a radar system which synthesizes expanded pulses. The synthesis is performed by generating a short pulse by a blocking oscillator or the like and passing the signal through a filter system producing the desired phase dispersion. When the received echo signal is passed through a matched filter system the original phase dispersion is removed and the pulse is compressed.

The system described in the above article produces a frequency modulated R.F. pulse, the waveform of which is diagrammatically represented in FIGURE 1A with an illustrative diagram of a pulse having only a few cycles. This R.F. pulse has a linear frequency modulation for which frequency is graphed as a function of time in FIGURE 1B at 2. The characteristics of the pulse in the frequency and time domains are graphically illustrated in FIGURES 1C–1E. FIGURE 1C presents the frequency spectrum 3 of the waveform which shows the rectangular form that provides the optimum range resolution. FIGURE 1D presents the phase spectrum 4 of the waveform as a function of frequency which indicates the parabolic characteristic of the function. The waveform therefore provides a rectangular envelope 5 for the transmitted pulse that produces a constant instantaneous amplitude as illustrated in FIGURE 1E (and FIGURE 1A).

In the operation of practical pulse compression radar systems, the radial motion of targets usually do not have any adverse effects. Ordinary target velocities merely introduce a proportional Doppler frequency shift which results in a delay or advance in the occurrence of the compressed pulse. However, with high compression ratios and targets having very high velocities on the order of 10,000 knots and higher, pulse smearing occurs. FIGURE 2A is a graph of representative curves 12, 13 and 14 of the pulse widening factor as a function of the compression ratio K for representative target velocities (radial). This graph illustrates, for example, that a vehicle with a radial velocity of 10,000 knots in a pulse compression system having a K factor of $5 \cdot 10^4$ will have a compressed signal return 2.75 times longer than a similar slower moving target. High target velocities also affect the maximum attainable range resolution. FIGURE 2B is a graph of the obtainable resolution $\Delta R/T$ ($T$=transmitted pulse length) as a function of the pulse compression ratio K for representative target velocities at 15 and 16. A typical result for a target having a radial velocity of 25,000 ft./sec. and a transmitter pulse length of 1,000 $\mu$sec. is that the range resolution is limited to 65 ft.

Accordingly, it is an object of the invention to provide a pulse compression radar system which enables detection of targets having unusually high radial velocities without degradation of the pulse waveform and without loss of the range resolution with increases in the pulse compression ratio.

It is a further object of the invention to provide a pulse compression radar system in which the pulse compression circuitry that processes the received pulses is phase matched to pulses having large Doppler frequency shifts.

It is a still further object of the invention to provide a communications system in which the transmission and reception of electromagnetic wave energy is substantially undegraded by relative motion between the transmitter and receiver by relative radial velocities at a substantial fraction of the speed of light.

Briefly stated, in accordance with one aspect of the invention, a pulse compression radar system is provided which substantially eliminates pulse degradation due to Doppler effects on echo returns. This is achieved by a modification of the pulse synthesis process which produces a radar pulse having a logarithmic phase dispersion characteristic. Preferably, the radar system utilizes a plurality of filter channels which operate in parallel upon a generated impulse to produce through the transform action of selected filters a plurality of pulse segments that are parabolic approximations of the desired logarithmic phase dispersion and which when combined provide a radar pulse having a logarithmic phase dispersion. The received echo pulses are subject to the inverse process to produce the desired compressed pulse. Because of the unique characteristics of the logarithmic phase dispersion, the pulse compression circuit operation is inherently adjusted to large Doppler frequency shifts.

The features of the invention which are believed to be novel are set forth with particularity in the appended claims. The invention itself, however, both as to its organization and method of operation, together with further objects and advantages thereof, may best be understood by reference to the following description when taken in connection with the drawings, wherein:

FIGURES 1A–E illustrate graphically various idealized characteristics of the waveforms utilized in pulse compression radar having linear frequency modulation.

Figure 3:
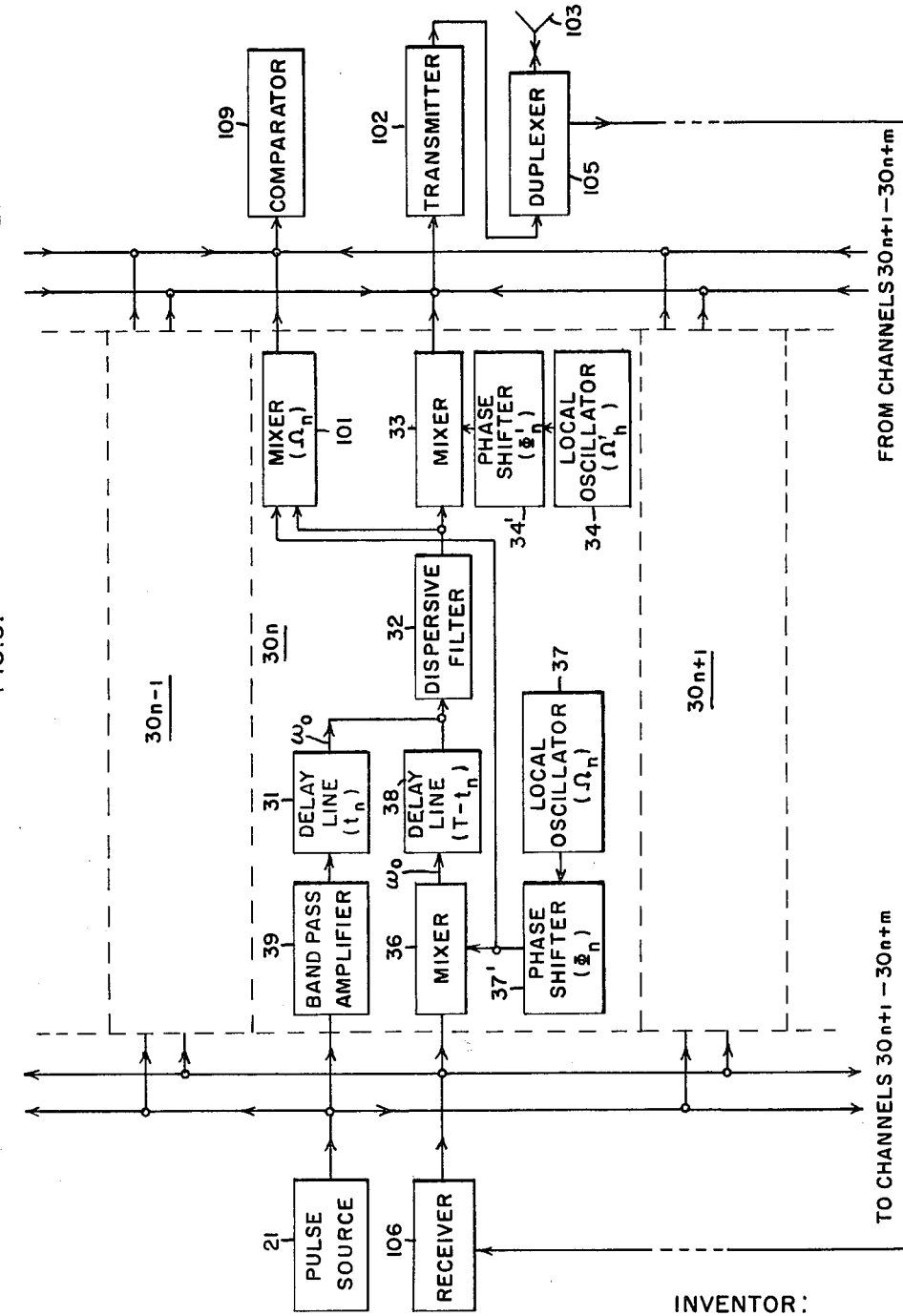
FIGURE 3 is a block diagram of a radar system utilizing a logarithmic phase modulation pulse compression.

FIGURES 4A–G are illustrations representing graphically the process of logarithmic phase modulation provided by the FIGURE 3 circuit pulse synthesis and pulse compression for three representative contiguous channels in which phase is plotted in respect to frequency. FIGURE 4H illustrates the frequency relationships for the pulse source, local oscillators and channel outputs for the FIGURE 3 circuit.

Figure 2A:
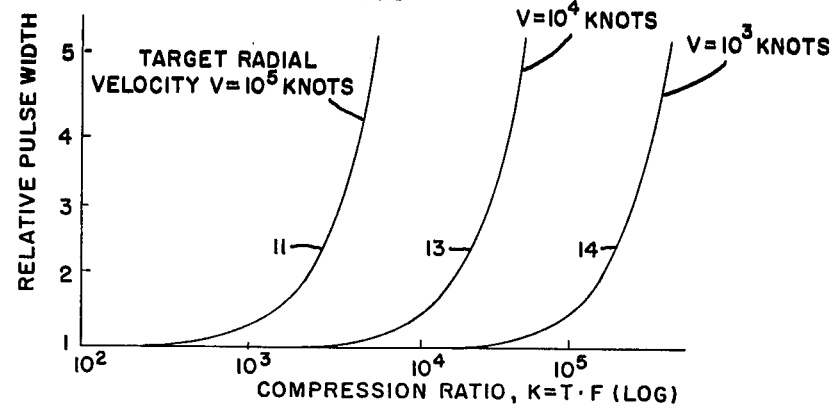
FIGURES 2A and 2B are graphs respectively of relative pulse width and range resolution as a function of the pulse compression ratio K for several representative target velocities for a linear frequency modulation radar system.
Figure 2B:
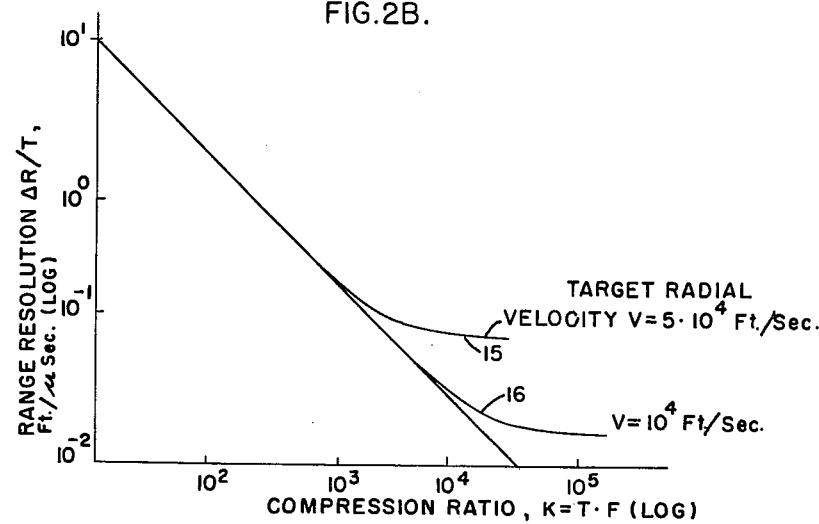
Figure 5:
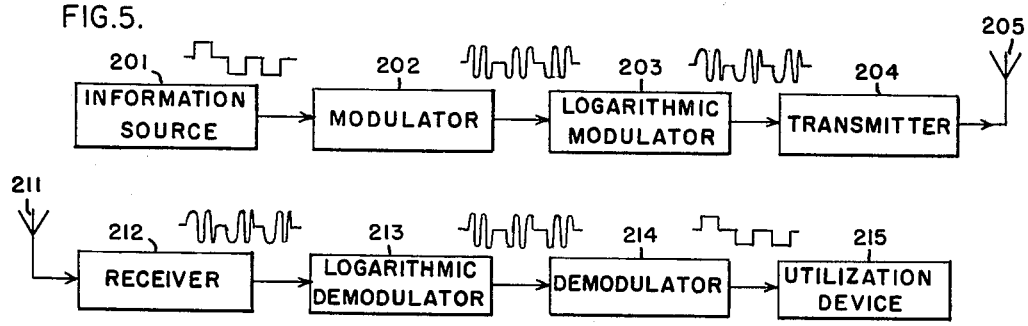

FIGURE 5 is a block diagram of a communications system which incorporates the invention.

FIGURE 3 is a block diagram of one embodiment of a radar system adapted to provide logarithmic pulse compression operation. The transmitting portion of the system comprises a pulse source 21, a plurality of pulse expansion filter channels for pulse synthesis such as a portion of circuit 30n, a transmitter 102, duplexer 105, and an antenna 103. The receiving portion of the radar system is comprised of antenna 103, duplexer 105, a receiver 106, a plurality of pulse compression channels such as a portion of 30n which includes parts common to the pulse synthesis channel, mixer 101 and a comparator 109.

With the exception of the filter apparatus, the components are conveniently those disclosed in the patent application Serial No. 706,048, "Radar Systems," by Robert C. Thor and Earl R. Wingrove, Jr., filed December 30, 1957, and assigned to the same assignee.

The output of pulse source 21 is equally divided between $n+m$ pulse compression circuits of which a representative circuit 30n is shown in FIGURE 3. Each circuit is comprised of the same parts, differing only in the adjustments required for the specific portion of the transmitted radar pulse synthesized in that circuit. The pulse synthesis channel of circuit 30n includes a band pass driving amplifier 39 and a signal delay element 31 which is a non-dispersive delay line. That is, delay line 31 introduces a linear phase response as a function of frequency. The function of the delay lines such as 31 is to stagger the outputs of the filter channels in time. The output of delay line 31 is applied to a nonlinear filter element 32. The sinusoidal pulse from source 21 is of such a short duration that it partakes of the nature of an impulse. The filter element 32 has a response characteristic such that it introduces phase shifts as a parabolic function of frequency. The output of filter 32 is then applied to a conventional mixer 33 which converts the signal wave to a higher frequency. However, a phase shifter element 34′ introduces a fixed phase shift in the local oscillator signal from oscillator 34 such that the output from mixer 33 has an initial phase corresponding to the proper phase fit with the adjacent lower channel output. The outputs of all of the channels are combined and applied to a conventional radar transmitter 102. Transmitter 102 provides further frequency up conversion and power amplification of the synthesized pulse which is appropriate for radar transmission from a conventional antenna system represented at 103.

The pulse compression system is adapted to perform a substantially inverse process upon received echo signals. Received signals pass from antenna 103 through conventional duplexer 105 and receiver 106. The received signal is converted down in receiver 106 and is applied to each of the previously described circuits in the same manner as the distribution from pulse source 21. In circuit 30n, for example, mixer 36 provides a frequency down conversion corresponding to the conversion in mixer 33 and a delay line 38 provides a time delay complementary to the delay provided by delay line 31. However, the frequency of local oscillator 37 is selected to provide a channel or side band inversion for reasons which will be more fully described hereinafter. The phase shift introduced by delay line 38 insures synchronization of the frequency components of the various channels for the compressed pulse. The received signals are then applied to the dispersive filter element 32 which compresses the signal. The outputs of all the individual channels are then combined and applied to comparator 109 after translating the spectrum segments to their proper positions in mixer 101.

Figure 4A:
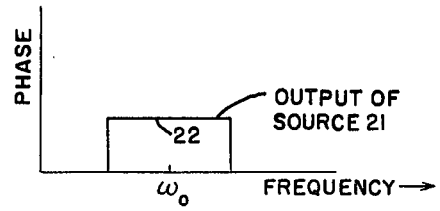
Figure 4B:
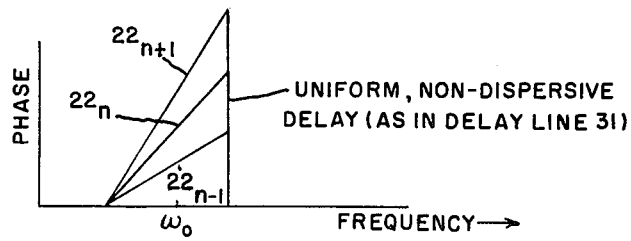
Figure 4C:
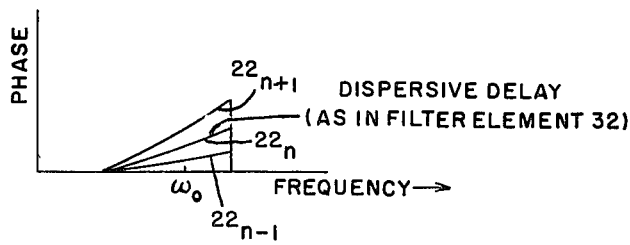
Figure 4D:
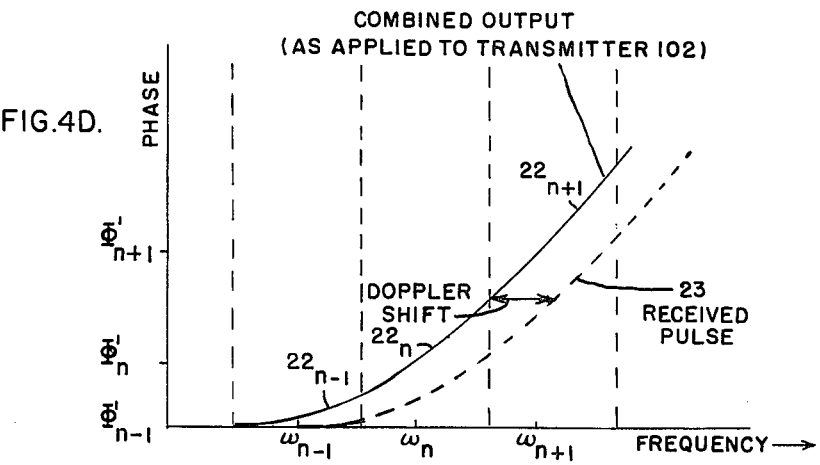

FIGURES 4A, 4B, 4C, and 4D are idealized phase graphs illustrating the pulse synthesis operation of the FIGURE 3 radar system. FIGURE 4A is a graph of the phase of the signal produced by pulse source 21 as a function of frequency. The pulsed sine wave has all frequency components initially in phase. FIGURE 4B is a graph of phase as a function of frequency for the signals in each pulse synthesis channel in which the curve segments $22_{n-1}$, $22_n$, and $22_{n+1}$ correspond to the signals in respective channels. These signals result from the distribution of pulse 22 to each of the channels and an appropriate delay provided by the nondispersive delay lines such as delay line 31 in circuit 30n. Since the time delay is the same for all frequency components in a single channel, the phase shift is a linear function of frequency. FIGURE 4C is a graph of phase as a function of frequency for each of the signals in the respective channels after passing through the dispersive filters. The curve segments $22_{n-1}$, $22_n$, and $22_{n+1}$ are parabolic approximations of the logarithmic ideal for the segments corresponding to the individual channels such as produced by the dispersive filter element 32 in channel 30n. FIGURE 4D is a graph of phase as a function of frequency for the combined output of all the channels of the system. Each of the segments $22_{n-1}$, $22_n$, $22_{n+1}$ is provided by the operation of a mixer such as mixer 33 which introduces the appropriate frequency shift. (The frequency scale in FIGURE 4D has been shifted for convenience.) Accordingly, the output of the combined channels is an approximation of a logarithmic phase modulated radar pulse which is therefore an expanded pulse.

The effect of relative motion between the target and the radar system is to produce a Doppler shift in all frequency components of the radar pulse. This Doppler shift can be expressed as follows:

$$(1) \qquad \Delta\omega = \omega \cdot 2v/c$$

where $v$ is the relative velocity and $c$ is the speed of light. This frequency dependent shift results in a phase dispersion of the frequency components of the radar pulse. The result is that the phase-frequency function of the synthesized pulse is distorted to the form illustrated at 23 in FIGURE 4D. For the proper operation of the pulse compression system it is essential that the compression circuitry be matched to the received pulse so that output pulses from the circuitry will have the frequency components in the proper phase. As is evident from inspection of FIGURE 4D, the portion of the received pulse which is processed in each channel has approximately the same form as that synthesized. That is, the phase slopes across the segment of the frequency spectrum in each channel are approximately the same. The difference is only in a fixed phase displacement for all frequency components between the transmitted frequency component and the received frequency component (omitting the constant time delay terms which add a phase shift linear with frequency). This relationship is unique to the logarithmic phase dispersion system of this invention. All other pulse compression systems will have degraded performance where high compression ratios and high target velocities are encountered.

It is also essential to proper operation with substantial Doppler shifts that the system utilize a multi-channel arrangement if both expansion and compression are to be accomplished with the same equipment. This is because proper operation requires that the nonlinear phase dispersion during pulse compression on each pulse frequency component (plus a constant) must be the complement to the nonlinear phase dispersion introduced during pulse synthesis. For large Doppler shifts, the pulse compression circuitry can be reasonably matched only over a limited segment of the frequency spectrum. In the FIGURE 3 system, good phase matching is insured because each filter element serves as its own conjugate and operates on only one fraction of the frequency spectrum.

The operation of each dispersive filter circuit such as $30n$ in the radar system of FIGURE 3 is substantially the same as the processing filters disclosed in the above cited patent application of Thor and Wingrove. In each pulse synthesis channel a band pass amplifier 39 is useful for providing a large amplitude driving pulse for the filter elements and is useful in providing the selection of the desired segment of the frequency spectrum for the respective channels. Conveniently, the filter elements such as 32 are very thin filamentary wires or flat strips in which the wire or strip acts as a solid acoustic waveguide. Over a range of frequencies where the wavelength is about equal to the wire diameter or thickness of the strip, the relation of group delay to frequency is closely linear. By a proper choice of wire or strip dimensions a dispersive delay line having the desired phase dispersion is provided.

In the system disclosed here, the dispersive filter elements are selected to provide an overall logarithmic phase dispersion which results in a hyperbolic frequency modulation of the transmitted pulse. With linearly dispersive delay lines, each channel provides parabolic phase dispersion and linear frequency modulation which is an approximation of the desired modulation. When the received pulses are applied to the parallel array of filter channels, the corresponding segments of the frequency spectrum are applied to the same channel which synthesized that segment for transmission (in the absence of Doppler shifts). The mixer 36 accordingly utilizes a local oscillator frequency differing from that of mixer 33. The choice of the local oscillator frequencies is such that frequency inversion is produced within the segment of the frequency spectrum of each channel. This enables the dispersive filter elements such as 32 to operate as its own conjugate. The relation of the local oscillator frequencies is as follows:

(2) $\quad \Omega_n' - \omega_0 = \omega_n$ (3) $\quad \Omega_n + \omega_0 = \omega_n$ where $\omega_n$ is the center frequency of the output of the $n$th channel. This results in the frequency components having complementary phase shifts introduced by the dispersive filter element during pulse synthesis for transmission and during pulse compression. Since there is also a complementary relationship between the phase shift introduced by delay line 38 and the phase shift of delay lines 31, the overall phase shift produced by the combined effects of delay lines 31 and 38 is a constant for all frequencies and is the same for all channels. Accordingly, the final processed pulse output which is applied to comparator 109 is substantially the same as the pulse supplied by the pulse source 21.

Figure 4E:
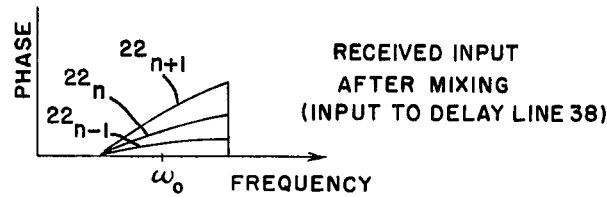
Figure 4F:
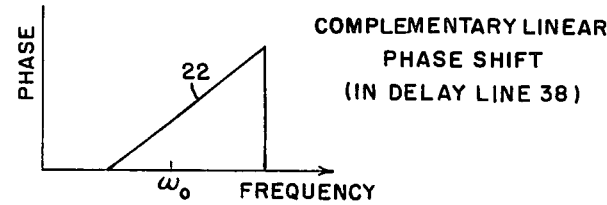
Figure 4G:
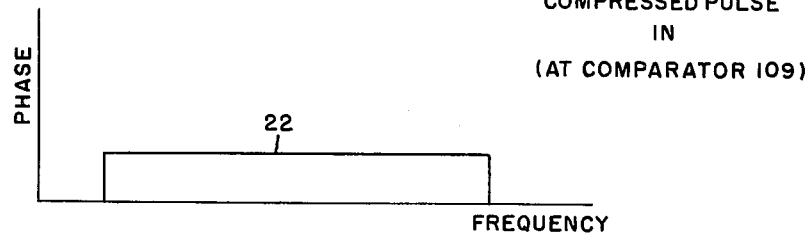
Figure 4H:
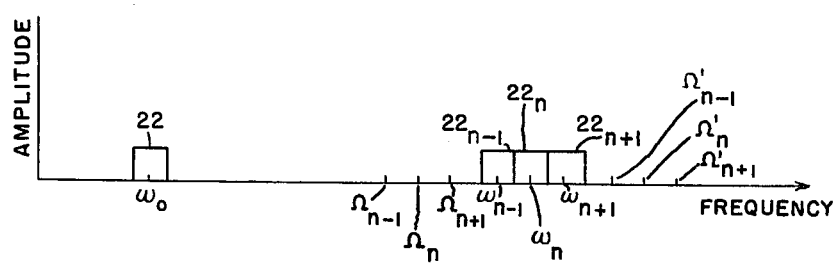

The pulse compression process is illustrated in FIGURES 4E–G in which the received pulses undergo a process which is essentially the inverse of the pulse synthesis illustrated in FIGURES 4A–D. The received pulse is first mixed by a channel mixer such as 36 to transpose the appropriate segment of the received pulse frequency spectrum to center about the channel center frequency $\omega_0$ (which is the same for all channels). During mixing, an appropriate phase shift $\Phi_n$ is introduced to align the phases of all the channels. The system is arranged to provide a channel by channel frequency inversion between the output of the dispersive filters during pulse synthesis and the application of pulses to the dispersive filters during pulse compression. This frequency inversion is conveniently obtained in the first mixers after the dispersive filters. The frequency relationships for mixing in the FIGURE 3 embodiment are illustrated in FIGURE 4H for the three representative channels and the corresponding local oscillator frequencies $\Omega'$ and $\Omega$. Because of this frequency inversion, the pulse compression channels provide the phase shifts illustrated in FIGURES 4B and 4F where 4F is complementary phase shift to that of 4B. It is to be understood that all of the filters, both dispersive and non-dispersive, provide increasing phase shifts as a function of increasing frequency on the applied signals. After the parabolic phase modulation is removed by the dispersive filters, each channel translates the segment of the pulse frequencies to their contiguous positions in the spectrum applied to comparator 109.

In the radar system of FIGURE 3, each dispersive filter element such as 32 is common to both a pulse synthesis channel and a pulse compression channel. However, it is possible to utilize entirely separate circuits for the two processes. With such an arrangement, pulse compression dispersive filter elements are preferably selected which have a complementary phase-frequency dispersion characteristic relative to the pulse synthesis filter elements. Accordingly, it is not necessary to provide frequency inversion within the pulse compression channels. But in general, instrumentation is simpler in the FIGURE 3 embodiment which incorporates good inherent phase matching through the use of common dispersive filter elements.

The FIGURE 3 system utilizes pulse compression circuitry in which the time delays in each channel are provided by separate elements each of which, such as lines 31 and 38 in circuit $30n$, provide all the delay required for the particular channel. Obviously, savings in the total delay line equipment can be made by tapping the longest delay lines as required.

The operation of the disclosed system can also be considered from the mathematical point of view. The common radar pulse, which is comprised of a number of cycles cut out of a continuous, constant amplitude (A), sine wave, having a phase velocity $\omega_0$ for a period T, can be expressed ideally as a function of time $t$ as follows:

(4) $\quad f(t) = A \cdot \text{RECT}\left(\dfrac{t}{T}\right) \cos(\omega_0 t)$ where RECT $(t/T)$ is the rectangular impulse function. In a pulse compression system such as that disclosed in the above cited article by Ramp and Wingrove, the linear frequency modulated pulse is given by Equation 5:

(5) $\quad f(t) = \text{RECT}\left(\dfrac{t}{T}\right) \cos(\omega_0 t + \epsilon t^2)$ where $\epsilon$ is the frequency modulation coefficient. This waveform has the Fourier transform (obtained with the Principle of Stationary Phase) as follows:

(6) $\quad F(\omega) = \dfrac{1}{2}\sqrt{\dfrac{\pi}{\epsilon}} \, \text{RECT}\left(\dfrac{\omega - \omega_0}{2\epsilon T}\right) e^{-j\left[\dfrac{(\omega - \omega_0)^2}{4\epsilon} - \dfrac{\pi}{4}\right]}$ A target having a radial velocity $v$ will modulate the radar pulse. The effect on the waveform after pulse compression (where $\nu=2v/c$) is a multiplication of the frequency terms $\omega$ by a factor $1+\nu$ as follows:

(7) $F_R(\omega) = A \cdot \text{RECT}\left[\frac{\omega-\omega_0(1+\nu)^{-1}}{2\epsilon T(1+\nu)^{-1}}\right]$
$e^{-j\left[\frac{\nu(2+\nu)(\omega-\omega_0)^2}{4\epsilon}+\frac{\nu(1+\nu)\omega_0\omega}{2\epsilon}-\frac{\nu(2+\nu)\omega_0^2}{4\epsilon}\right]}$ The first term in the exponential corresponds to a linear frequency modulation which is a phase dispersion causing pulse lengthening. The second and third terms are respectively time and phase shift terms which do not degrade the pulse.

The pulse lengthening produced by the Doppler modulation is not large for pulse compression systems having $T \cdot F$ products less than $10^4$ or targets having low velocities. However, to remove these restrictions it has been found desirable to use an improved waveform. This waveform has a logarithmic phase dispersion in place of the parabolic phase dispersion in prior systems and has a hyperbolic frequency modulation in place of the linear frequency modulation. The waveform is given as follows:

(8)
$$f(t) = \text{RECT}\left(\frac{t}{T}\right) \cos\left[\frac{\omega_0^2}{2\epsilon} \text{LOG}\left(1-\frac{2\epsilon t}{\omega_0}\right)\right]$$

The Fourier transform of the waveform is as follows:

(9) $F(\omega) = \frac{\omega_0}{\omega}\sqrt{\frac{\pi}{\epsilon}} \text{RECT}\left[\frac{\omega_0}{2\epsilon T}\left(\frac{\omega_0}{\omega}-1\right)\right]$
$\cdot e^{-j\left[\frac{\omega_0(\omega-\omega_0)}{2\epsilon}+\frac{\omega_0^2}{2\epsilon}\text{LOG}\left(\frac{\omega_0}{\omega}\right)-\frac{\pi}{4}\right]}$ The Doppler effect on the waveform after pulse compression processing can be expressed as follows:

(10) $F_R(\omega) = A \cdot \text{RECT}\left[\frac{\omega_0}{2\epsilon T}\left(\frac{\omega_0}{(1+\nu)\omega}-1\right)\right]$
$\cdot e^{-j\left[\frac{\nu\omega_0\omega}{2\epsilon}-\frac{\omega_0^2}{2\epsilon}\text{LOG}(1+\nu)\right]}$ As is clear by inspection, there is no phase dispersive term introduced corresponding to the first term of the exponential in Equation 7. These equations are also useful in the choice of dispersive filter elements which are selected to provide the proper value of $\epsilon$.

The pulse synthesis process illustrated in FIGURES 4A–4D and realized in FIGURE 3 circuit is susceptible to substantial variation in the selection of constants and the like. For example, it has been implicit in the description that the bandwith for each channel is the same. This is the most convenient arrangement but is not necessary. Further, the selection of the time delay provided in the pulse synthesis channels (by delay line 31, for example) is determined by the required relative staggering of channel outputs. Accordingly, this delay can be selected to result in a zero delay in the first channel which permits the omission of the first delay line. The converse relationship holds for the delay lines in the pulse compression channels. Still further, the logarithmic phase dispersion filter elements can be replaced with active modulators if sufficiently stable elements are available. Also, in the selection of the dispersive delay lines 32, the preferred parabolic phase dispersion segment has the following characteristic:

(11) $\epsilon_n = \omega_n^2/2k$ and the linear delay line has the value:

(12) $t_n = T_0 + k/\omega_n$

This permits a $T \cdot F$ product of $n^2 \cdot 10^4$ before substantial pulse degradation.

It is also possible to utilize a serrated approximation to a logarithmic phase dispersion by having a fixed time delay factor $t_n$=constant. This results in the superposition of all the channel outputs during pulse synthesis (as opposed to the serial combination above). However, this requires that the $\epsilon$ factor to be as follows:

(13) $\epsilon_n = \omega_n/2k'$ and this limits the $T \cdot F$ product to $n \cdot 10^4$.

A radio communication system is illustrated in block form in FIGURE 5 which incorporates logarithmic modulation to enable communication which is substantially insensitive to relative motion between a transmitter and a receiver at relatively high radial velocities. A representative source of information 201 provides data signals of generally conventional form such as positive and negative polarity pulses which represent binary information. The output of information source 201 is applied to a conventional modulator which, for example, provides sinusoidal output signals that represent binary information by phase modulation which is recognizable by initial occurrence at 0° or 180° phase. The output of modulator 203 conveniently takes the form of a passive filter network such as channel 30n in FIGURE 3. The resulting output is logarithmically phase modulated in a manner corresponding to the operation of the FIGURE 3 system and is applied to a conventional transmitter 204 for frequency up conversion and amplification and radiated from antenna 205. The receiving portion of the system performs a process inverse to that employed during transmission. The reecived signals from antenna 211 are amplified and preferably converted down in receiver 212. The signal is applied to a logarithmic demodulator 213 which removes the logarithmic phase modulation imposed by modulator 203 during transmission. The output of the logarithmic demodulator 213 is then applied to the utilization device 215 after demodulation in demodulator 214. When the transmitter portion of the system has a radial velocity which is large relative to the receiver portion of the system the received signals will have a large Doppler frequency shift as a function of the radial velocity. However, because of the nature of the logarithmic modulation provided in the FIGURE 5 system, the receiver portion of the system operates upon the shifted signals without substantial degradation. This mode of operation is enabled by the same relationship as that illustrated in FIGURE 4D for the transmitted and received signals 22 and 23 and is independent of the Doppler frequency shift.

While the fundamental novel features of the invention have been shown and described as applied to illustrative embodiments, it is to be understood that all modifications, substitutions and omissions obvious to one skilled in the art are intended to be within the spirit and scope of the invention as defined by the following claims.

What is claimed is:
1. A radio communication system utilizing logarithmic phase modulation to provide substantial insensitivity to large Doppler frequency shifts:
   (a) a source of radio frequency information signals comprising pulses having a sinusoidal waveform;
   (b) a first filter circuit coupled to said source having a time delay response characteristic to said information signal which produces an expanded pulse having a phase spectrum that is an approximately logarithmic function of frequency;
   (c) a transmitter, coupled to said first filter circuit for providing an approximately logarithmic phase function, for transmitting the pulses;
   (d) a receiver responsive to the transmitted pulses, and
   (e) a second filter circuit coupled to said receiver having a time delay response characteristic which is matched to the first filter characteristic to compress the received pulses whereby the receiver is substantially insensitive to large Doppler frequency shifts.

2. A pulse compression radar system utilizing logarithmic phase modulation comprising:

(a) a source of short duration pulses having a radio frequency sinusoidal waveform;
(b) a first filter circuit coupled to said source having a time delay response characteristic to said short pulses which produces an expanded pulse having a phase spectrum that is an approximately logarithmic function of frequency;
(c) a radar transmitter coupled to said first filter apparatus for transmitting said modulated pulses;
(d) a radar receiver responsive to echoes of said transmitted pulses;
(e) a second filter circuit coupled to said receiver having a time delay response characteristic which is matched to said first filter characteristic to compress the received pulses; and
(f) a comparator coupled to said pulse source and said second filter apparatus for comparing the initial short duration pulse and the compressed echo pulse.

3. A pulse compression radar system utilizing logarithmic phase modulation comprising:
(a) a source of short duration pulses having a radio frequency sinusoidal waveform;
(b) delay means coupled to said source and arranged to distribute said pulses into a plurality of channels, which process contiguous segments of the pulse spectrum, with a staggered occurrence in time;
(c) a plurality of pulse synthesis modulators, each modulator forming a part of one of said channels and being coupled to said delay means, said modulators being selected to provide an approximately logarithmic phase dispersion to said pulse;
(d) a radar transmitter coupled to all of said modulators for transmitting said modulated pulses;
(e) a radar receiver responsive to echoes of said transmitted pulses;
(f) a plurality of inverter means, coupled in parallel to said receiver, each inverter means passing the same segment of the pulse frequency spectrum passed by a corresponding pulse synthesis channel and adjusted to invert the frequencies within each channel about the center frequency of the channel; and
(g) a plurality of pulse compression modulator means, each modulator means being coupled to a respective inverter, to provide a phase dispersion to said received pulse which is matched to said pulse synthesis modulator to produce pulse compression.

4. The pulse compression radar system of claim 3 further comprising:
(a) a plurality of dispersive filter elements having a parobolic phase dispersion characteristic as a function of frequency, each filter element forming a part of one of said pulse synthesis modulators and being selected to provide the appropriate approximation of a logarithmic phase dispersion over the channel segment of pulse frequencies.

5. The pulse compression radar system of claim 3 further comprising:
(a) a plurality of first mixers, each mixer forming a part of a pulse synthesis channel and coupled between said pulse synthesis modulators and said transmitter; and
(b) a plurality of second mixers, each mixer forming a part of a pulse compression channel and coupled between said receiver and said pulse compression modulator means, said first and second mixers being selected to provide side band frequency inversion within the spectrum segments processed by the respective modulator means.

6. The pulse compression radar system of claim 5 further comprising:
(a) a plurality of phase shift means coupled to respective ones of said first mixers to introduce a phase shift in said modulated pulses which fits the output of each first mixer with the output of another first mixer processing the lower contiguous segment of the pulse spectrum; and
(b) second delay means coupled between said receiver and said pulse compression modulated means to provide a time delay to each segment of the received pulse spectrum which is complementary to the time delay of the spectrum segment in said first delay means.

7. The pulse compression radar system of claim 3 having said delay means adjusted to distribute said pulses to said pulse synthesis modulators with the same time delay to produce a serrated logarithmic pulse synthesis.

8. A pulse compression radar circuit for modulation of an impulse and demodulation of the transmitted modulated impulse with logarithmic phase dispersion comprising:
(a) a plurality of expanded pulse synthesis channels arranged in parallel to respond to contiguous segments of the frequency spectrum of an applied impulse having a radio frequency sinusoidal waveform;
(b) a plurality of modulators, each modulator forming a part of one of said pulse synthesis channels which introduces an approximation of a logarithmic phase dispersion in the respective segment of the impulse spectrum;
(c) a plurality of pulse compression channels arranged in parallel to respond to contiguous segments of the frequency spectrum of an echo pulse;
(d) a plurality of modulators, each modulator forming a part of one of said pulse synthesis channels which demodulates the echo pulse by introducing an approximation of a logarithmic phase dispersion in the respective segment of the pulse spectrum which is complementary to the phase dispersion introduced during pulse synthesis.

9. A pulse compression radar circuit for modulation of an impulse and demodulation of the transmitted modulated impulse with logarithmic phase dispersion comprising:
(a) a plurality of expanded pulse synthesis channels arranged in parallel to respond to contiguous segments of the frequency spectrum of an applied impulse having a radio frequency sinusoidal waveform;
(b) a plurality of modulators, each modulator forming a part of one of said pulse synthesis channels which introduces an approximation of a logarithmic phase dispersion in the respective segment of the impulse spectrum;
(c) a plurality of pulse compression channels arranged in parallel to respond to contiguous segments of the frequency spectrum of an echo pulse with each spectrum segment being coextensive with a spectrum segment of a corresponding pulse synthesis channel;
(d) a plurality of frequency inverters, each inverter forming a part of one of said pulse compression channels which inverts the frequencies of a segment of echo pulse frequencies about the center frequency of the channel; and
(e) a plurality of coupling means, each coupling means forming a part of one of said pulse compression channels which couples the output of the respective inverters to a corresponding one of said modulators which are common to both the pulse synthesis and pulse compression channels and which is phase matched to the segment of the received pulse after frequency inversion to produce pulse compression.

10. The pulse compression radar circuit of claim 9 further comprising:
(a) a plurality of dispersive filter elements having a parabolic phase dispersion characteristic as a function of frequency, each filter element forming a part of one of said pulse synthesis modulators and being selected to provide the appropriate approximation of a logarithmic phase dispersion over the channel segment of pulse frequencies.

11. The pulse compression radar circuit of claim 10 further comprising:
    (a) a plurality of first mixers, each mixer forming a part of a pulse synthesis channel and coupled between said pulse synthesis modulators and said transmitter; and
    (b) a plurality of second mixers, each mixer forming a part of a pulse compression channel and coupled between said receiver and said pulse compression modulator means, said first and second mixers being selected to provide side band frequency inversion within the the spectrum processed by the respective modulator means.

12. The plsue compression radar circuit of claim 11 further comprising:
    (a) a plurality of phase shift means coupled to respective ones of said first mixers to introduce a phase shift in said modulated pulses which fits the output of each first mixer with the output of another first mixer processing the lower contiguous segment of the pulse spectrum; and
    (b) second delay means coupled between said receiver and said pulse compression modulator means to provide a time delay to each segment of the received pulse spectrum which is complementary to the time delay of the spectrum segment in said first delay means.

13. The pulse compression radar circuit of claim 12 having said delay means adjusted to distribute said pulses to said pulse synthesis modulators with the same time delay to produce a serrated logarithmic pulse synthesis.

14. A pulse compression radar system utilizing logarithmic phase modulation comprising:
    (a) a source of short duration pulses having a radio frequency sinusoidal waveform;
    (b) a plurality of expanded pulse synthesis channels coupled in parallel to said pulse source for processing contiguous segments of the frequency spectrum of said pulse;
    (c) first delay means forming first parts of said pulse synthesis channels to stagger the occurrence in time of said pulses in said channels;
    (d) a plurality of bandpass amplifiers, each amplifier forming a part of one of said pulse synthesis channels, which passes the appropriate segment of the frequency spectrum;
    (e) a plurality of dispersive filter elements, each element forming a part of one of said pulse synthesis channels and driven by one of said amplifiers to produce a parabolic phase dispersion as a function of frequency within the segment of the pulse spectrum for the respective channel which is an appropriate approximation of a logarithmic phase dispersion;
    (f) a plurality of first mixers, each mixer forming a part of one of said pulse synthesis channels and coupled to a respective filter element to convert the frequencies of the modulated pulse segment;
    (g) a plurality of phase shift means, each phase shift means forming a part of one of said pulse synthesis channels and coupled to a respective first mixer for adjusting the output phase of said channels to provide a substantially continuous logarithmic phase dispersion over all of said channels;
    (h) a radar transmitter coupled to all of said pulse synthesis channels for transmitting said modulated pulses;
    (i) a radar receiver responsive to echoes of said transmitted pulses;
    (j) a plurality of pulse compression channels coupled in parallel to said receiver for processing contiguous segments of the frequency spectrum of said received pulses corresponding to respective pulse synthesis channels;
    (k) a plurality of second mixers, each mixer forming a part of one of said pulse compression channels and coupled to said receiver, said second mixers converting the received pulses in such a manner that the frequency components are inverted about the center frequency of the channel;
    (l) a plurality of second delay means, each delay means forming a part of one of said pulse compression channels and coupled to a respective second mixer, for producing a complementary delay in respect to the delay of said first delay means in such a manner that the outputs of said channels are synchronized;
    (m) a plurality of coupling means, each coupling means forming a part of one of said pulse compression channels which couples the output of the respective second mixer to said dispersive filter element which is phase matched to the segment of the received pulse after frequency inversion to produce pulse compression by the modulation of the filter element; and
    (n) a comparator coupled to said pulse source and all of said pulse compression channels for comparing the initial short duration pulse and the recombined compressed echo pulse.

References Cited by the Examiner

UNITED STATES PATENTS

| | | | |
|---|---|---|---|
| 2,624,876 | 1/53 | Dicke | 343—17.2 |
| 2,678,997 | 5/54 | Darlington. | |
| 3,156,914 | 10/64 | Welti | 343—17.1 |
| 3,157,874 | 11/64 | Alter et al. | 343—10 |

OTHER REFERENCES

Ohman: "Getting High Range Resolution with Pulse Compression Radar," Electronics, Oct. 7, 1960, pp. 53–57.

Ramp et al.: Principles of Pulse Compression, IRE Transaction on Military Electronics, April 1961, pp. 109–116.

CHESTER L. JUSTUS, *Primary Examiner.*